United States Patent
Zhang et al.

(10) Patent No.: US 9,276,782 B1
(45) Date of Patent: Mar. 1, 2016

(54) PRECURSOR INTER-SYMBOL INTERFERENCE REDUCTION

(71) Applicant: Xilinx, Inc., San Jose, CA (US)

(72) Inventors: Hongtao Zhang, San Jose, CA (US); Geoffrey Zhang, San Jose, CA (US); Yu Liao, Longmont, CO (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/698,588

(22) Filed: Apr. 28, 2015

(51) Int. Cl.
*H04L 25/03* (2006.01)

(52) U.S. Cl.
CPC ................................ *H04L 25/03076* (2013.01)

(58) Field of Classification Search
USPC ................. 375/248, 296, 260, 326, 148, 233; 455/296, 272
See application file for complete search history.

(56) References Cited

U.S. PATENT DOCUMENTS

| | | | | |
|---|---|---|---|---|
| 7,158,568 B2 * | 1/2007 | Park | ...................... | H04L 1/0046 375/233 |
| 7,342,981 B2 * | 3/2008 | Wongwirawat | ..... | H04L 25/0307 375/229 |
| 7,606,293 B2 * | 10/2009 | Kim | ..................... | H04B 1/7097 375/145 |
| 8,982,941 B2 * | 3/2015 | Chmelar | ................ | H04L 25/063 375/233 |
| 2003/0086515 A1 * | 5/2003 | Trans | ........................ | H04B 1/00 375/346 |
| 2005/0063498 A1 * | 3/2005 | Chen | ..................... | H04B 1/7105 375/348 |
| 2005/0107057 A1 * | 5/2005 | Sun | ....................... | H04B 7/0845 455/272 |
| 2005/0186933 A1 * | 8/2005 | Trans | ....................... | H04B 1/00 455/296 |
| 2008/0224793 A1 * | 9/2008 | Babanezhad | .......... | H04B 3/235 333/18 |
| 2008/0304589 A1 * | 12/2008 | Tsuruta | ................. | H04L 25/022 375/260 |

\* cited by examiner

*Primary Examiner* — Eva Puente
(74) *Attorney, Agent, or Firm* — W. Eric Webostad

(57) ABSTRACT

In a receiver, there is a precursor iterative canceller ("PIC") having first and second paths. A postcursor decision block is coupled to the PIC to provide a decision signal thereto. The PIC includes: comparators for receiving an input signal and corresponding threshold inputs for precursor ISI speculation; and select circuits for selecting a first speculative input for the first path and a second speculative input for the second path, respectively associated with a negative precursor contribution and a positive precursor contribution. The first path and the second path in combination include at least a first stage and a second stage for processing the first speculative input and the second speculative input. The decision signal is provided to the first stage and to the select circuits. The select circuits are coupled to receive the decision signal for selection of the first speculative input and the second speculative input.

20 Claims, 8 Drawing Sheets

PRECURSOR INTER-SYMBOL INTERFERENCE REDUCTION

TECHNICAL FIELD

The following description relates to integrated circuit devices ("ICs"). More particularly, the following description relates to precursor inter-symbol interference reduction for an IC.

BACKGROUND

Decision feedback equalization ("DFE") may generally be used for reducing postcursor inter-symbol interference ("ISI"). Along those lines, a decision is made, such as by a slicer, and this decision is used in DFE to remove effect of such decision on a subsequent or "future" bit.

In contrast, feed-forward equalization ("FFE") may generally be used for reducing precursor ISI. Precursor ISI is a future bit having an ISI effect on a current bit. Along those lines, FFE may be used prior to making a decision, such as by a slicer. However, absence of advanced knowledge of what a future bit is, other than such a bit is going to be either a logic one or logic zero, makes it difficult to cancel ISI using FFE.

Accordingly, it would be desirable and useful to provide better cancellation of precursor ISI prior to having made a decision.

SUMMARY

A receiver relates generally receiving data via a communications channel. In this receiver, there is a precursor iterative canceller having a first path and a second path. A postcursor decision block is coupled to the precursor iterative canceller to provide a decision signal thereto. The precursor iterative canceller includes: a plurality of comparators for receiving an input signal and for receiving corresponding threshold inputs, the threshold inputs for precursor ISI speculation; and select circuits for selecting a first speculative input for the first path and a second speculative input for the second path, the first speculative input and the second speculative input are respectively associated with a negative precursor contribution and a positive precursor contribution. The first path and the second path in combination include at least a first stage and a second stage for processing the first speculative input and the second speculative input. The decision signal is provided to the first stage and to the select circuits. The select circuits are coupled to receive the decision signal for selection of the first speculative input and the second speculative input.

A method relates generally to operation of a receiver. In this method, obtained are precursor and postcursor ISI magnitudes associated with a communications channel coupled to the receiver. First thresholds and second thresholds are generated from the precursor and postcursor magnitudes obtained. The receiver includes a precursor iterative canceller having a first path and a second path. The receiver further includes a postcursor decision block coupled to the precursor iterative canceller to provide a decision signal thereto. Data traffic is received via the communications channel. The data traffic received is compared to the first thresholds and the second thresholds generated to provide a first speculative input, a second speculative input, and the decision signal. The first speculative input and the second speculative input are iterative look ahead processed including using the decision signal for providing a bitstream. The iterative look ahead processing includes reducing precursor ISI in the data traffic for providing the bitstream. The bitstream is output.

A system relates generally to receiving data. In this system, an analog preprocessing block is for coupling to a communications channel. A precursor iterative canceller has a first path and a second path coupled to the analog preprocessing block. A postcursor decision block is coupled to the analog preprocessing block and to the precursor iterative canceller. The postcursor decision block is coupled to provide a decision signal to the precursor iterative canceller. The precursor iterative canceller includes: a plurality of comparators for receiving an input signal and for receiving corresponding threshold inputs, the threshold inputs for precursor ISI speculation; and select circuits for selecting a first speculative input for the first path and a second speculative input for the second path, the first speculative input and the second speculative input are respectively associated with a negative precursor contribution and a positive precursor contribution. The first path and the second path in combination include at least a first stage and a second stage for processing the first speculative input and the second speculative input. The decision signal is provided to the first stage and to the select circuits. The select circuits are coupled to receive the decision signal for selection of the first speculative input and the second speculative input.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before further describing the examples illustratively depicted in the several figures, some reasons for using a precursor reduction block as described herein may be useful to further understanding. Conventional receiver-side equalization for a serializer-deserializer ("SerDes") may include continuous time linear equalization ("CTLE"), FFE, and/or DFE. CTLE may be effective for reducing postcursor ISI, but CTLE may suffer from noise and crosstalk enhancement due to high-frequency peaking in a transfer function of a CTLE block. In contrast, DFE may reduce postcursor ISI without noise and crosstalk amplification, but DFE may not reduce precursor ISI. FFE can reduce both precursor and postcursor ISI, but FFE may amplify noise and crosstalk. Furthermore, for some analog-based receivers, power consumption and semiconductor area consumption to implement FFE may be too high.

Use of a precursor ISI reduction block as described herein instead of an FFE block may be beneficial, because a precursor ISI may have less power consumption and/or may use less semiconductor area than a conventional FFE. As precursor ISI reduction block as described herein reduces precursor ISI, and CTLE and DFE do not reduce precursor ISI, such a precursor ISI reduction block may be beneficial in systems using DFE or using CTLE and DFE.

As described below in additional detail, a precursor ISI reduction block as described herein includes a precursor iterative canceller ("PIC"). A PIC, which may be used in a SerDes receiver for high-speed serial communication, uses precursor speculation and then iteratively chooses a direction of effect of precursor ISI. Effective removal of precursor ISI may be obtained, which may yield an enhanced bit error rate ("BER") for a receiver's data output. By iteratively looking ahead to make a decision, BER may be continually improved iteration-to-iteration. Along those lines, by increasing the number of iteration stages, BER may be improved, which means a PIC as described herein may be scaled up or down for a target BER. Furthermore, a PIC as described herein does not amplify noise or crosstalk.

With the above general understanding borne in mind, various configurations for a precursor ISI reduction block having at least one PIC are generally described below.

Figure 1A:
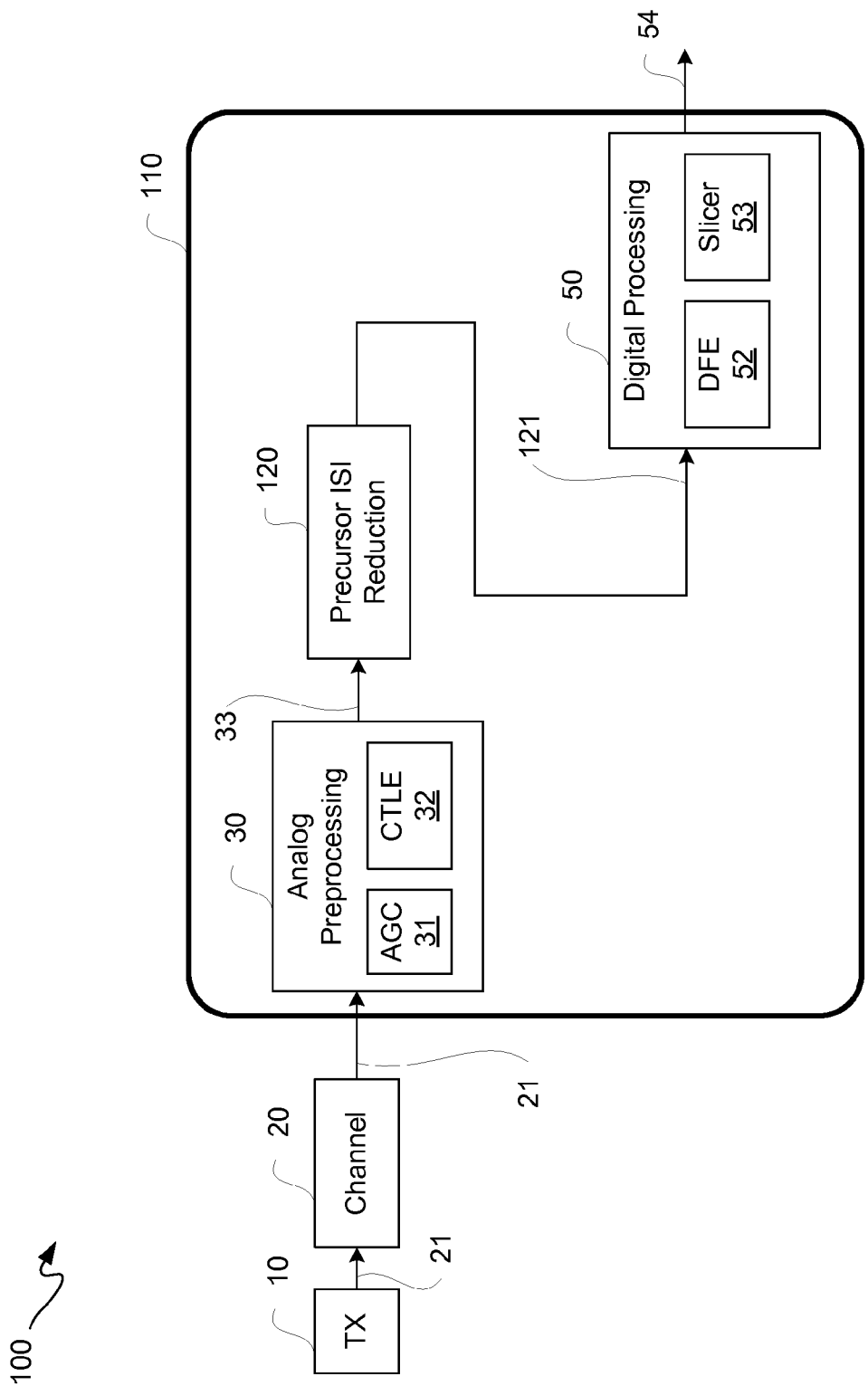
FIG. 1A is a block diagram depicting an exemplary communications system.

FIG. 1A is a block diagram depicting an exemplary communications system 100. Communications system 100 may include a transmitter 10, a communications channel 20, and a receiver 110. Transmitter 10 may transmit a modulated signal 19 via communications channel 20 to receiver 110, and ISI may be unwantedly added to modulated signal 19 resulting in modulated signal 21 at input to receiver 110.

Receiver 110 may be implemented in an FPGA or other IC. Channel 20 may be a backplane channel or other tethered channel for high-speed serial communication. By high-speed, it is generally meant a serial data rate in excess of 40 gigabits per second. Receiver 110 may be of a serializer-deserializer ("SerDes"). Though only a serial portion of receiver 110 is illustratively depicted, a parallel portion may be coupled thereto for conversion of recovered serial data into parallel data. Such parallel portion is not illustratively depicted for purposes of clarity and not limitation.

Receiver 110 may include an analog preprocessing block 30, a precursor ISI reduction block 120, and a digital processing block 50. Receiver 110 may processes a received modulated signal 21 to provide decisions/output data 54 therefor. For purposes of clarity and not limitation, some components of receiver 110 are not illustratively depicted, as only precursor ISI reduction block 120 is added to receiver 110. However, some known components of receiver 110 are described herein for purposes of clarity by way of context.

Analog preprocessing block 30 receives modulated signal 21. Analog preprocessing block 30 may include an automatic gain control ("AGC") block 31 and/or a continuous time linear equalization ("CTLE") block 32 to provide a pre-equalized analog signal 33.

Precursor ISI reduction block 120 may be coupled to receive an analog signal 33 output from analog preprocessing block 30 to provide a precursor ISI reduced digital sample signal 121, where k is used herein below to indicate k digital samples for k an integer greater than zero.

Digital processing block 50 may be coupled to receive digital samples 121 from precursor ISI reduction block 120 to provide decisions/output data 54 therefor. Digital processing block 50 may include a decision feedback equalization ("DFE") block 52 and a slicer 53. Accordingly, a feed-forward equalization ("FFE") block may be omitted from digital processing block 50 in favor of precursor ISI reduction block 120. Accordingly, precursor ISI reduction block 120 may provide an analog-to-digital conversion function as described hereinbelow in additional detail.

Generally, DFE block 52 is to reduce postcursor ISI in such digital samples 121. DFE equalized digital samples may effectively be sufficiently cleaned-up for input to slicer 53 to make accurate decisions for providing decisions/output data 54.

However, precursor ISI reduction block 120 is not limited to receiving a pre-equalized or equalized analog signal 33. Along those lines, a modulated signal 21 may be directly input to precursor ISI reduction block 120 in another implementation of a receiver 110. Furthermore, rather than inputting an analog signal to precursor ISI reduction block 120, a digital signal may be input. Along those lines, digital comparators, rather than analog comparators of precursor ISI reduction block 120 as described below, may be used instead of such analog comparators.

Figure 1B:
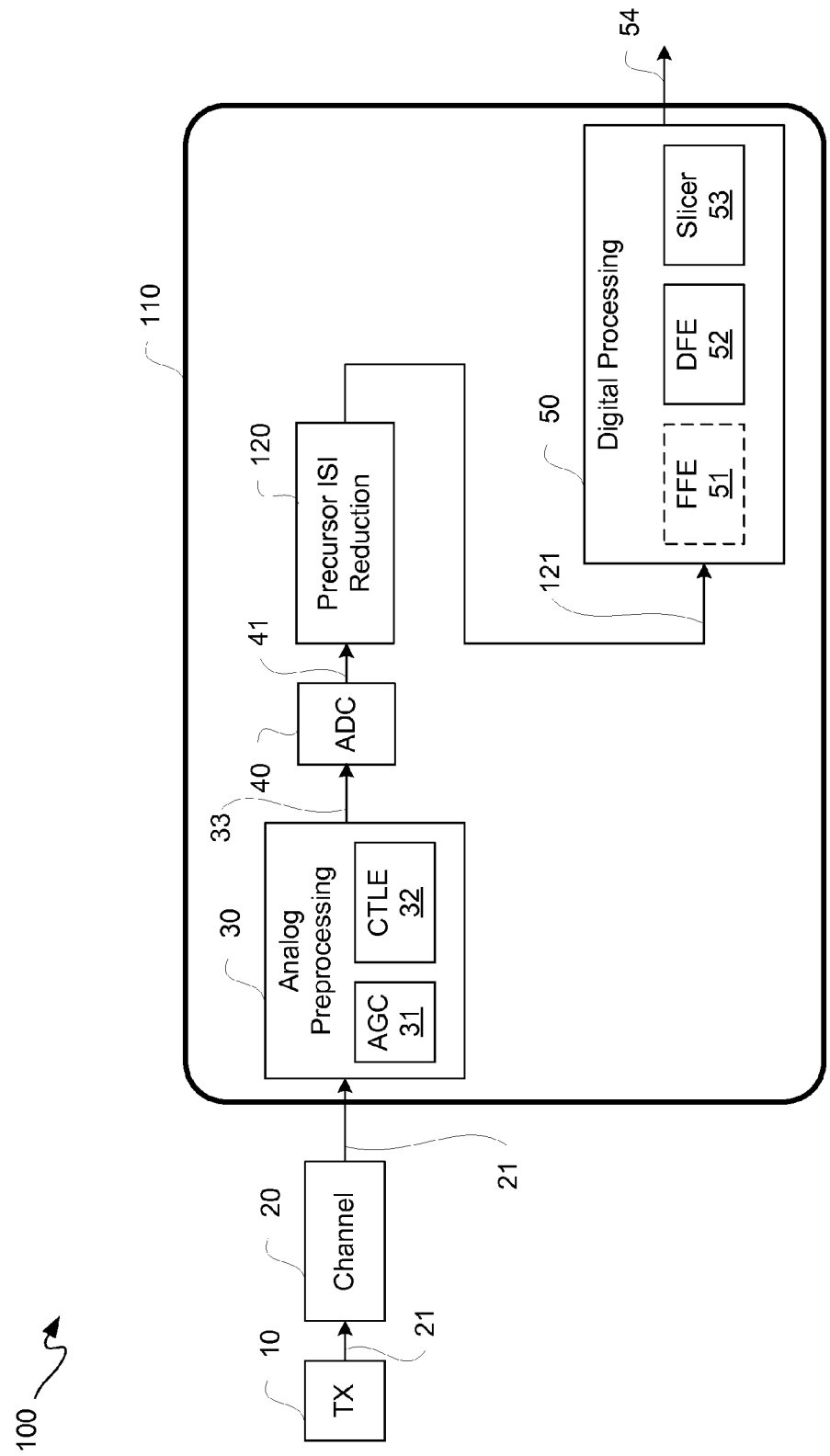
FIG. 1B is a block diagram depicting another exemplary communications system.

FIG. 1B is a block diagram depicting another exemplary communications system 100. Communications system 100 may include a transmitter 10, a communications channel 20, and a receiver 110. Transmitter 10 may transmit a modulated signal 21 via communications channel 20 to receiver 110. Receiver 110 may be implemented in an FPGA or other IC. Channel 20 may be a backplane channel or other tethered channel for high-speed serial communication. By high-speed, it is generally meant a serial data rate in excess of 40 gigabits per second. Receiver 110 may be of a SerDes. Though only a serial portion of receiver 110 is illustratively depicted, a parallel portion may be coupled thereto for conversion of recovered serial data into parallel data. Such parallel portion is not illustratively depicted for purposes of clarity and not limitation.

Receiver 110 may include an analog preprocessing block 30, an analog-to-digital converter ("ADC") 40, a precursor ISI reduction block 120, and a digital processing block 50. Receiver 110 may processes a received modulated signal 21 to provide decisions/output data 54 therefor. For purposes of clarity and not limitation, some components of receiver 110 are not illustratively depicted, as only precursor ISI reduction block 120 is added to receiver 110. However, some known components of receiver 110 are described herein for purposes of clarity by way of context.

Analog preprocessing block 30 receives modulated signal 21. Analog preprocessing block 30 may include an AGC block 31 and/or a CTLE block 32 to provide a pre-equalized analog signal 33.

ADC 40 may be coupled to receive analog signal 33 to provide digital samples 41 therefor. Precursor ISI reduction block 120 may be coupled to receive digital samples 41 output from ADC 40 to provide precursor ISI reduced digital samples 121. In this implementation, precursor ISI reduction block 120 provides a digital-to-digital conversion, and not an analog-to-digital conversion as in the example of FIG. 1A.

Digital processing block 50 may be coupled to receive digital samples 121 from precursor ISI reduction block 120 to provide decisions/output data 54 therefor. Digital processing block 50 may optionally include FFE block 51, and may include a DFE block 52 and a slicer 53.

Generally, assuming FFE block 51 is present, FFE block 51 may first process digital samples 121 to further reduce precursor ISI followed by DFE block 52 to reduce postcursor ISI in such digital samples 121. Again, in some receiver applications, use of precursor reduction block 120 may facilitate omission of FFE block 51. For purposes of clarity by way of example and not limitation, it shall be assumed that FFE block 51 is not present even though it may be included in some applications. Such DFE equalized digital samples may effectively be sufficiently cleaned-up for input to slicer 53 to make accurate decisions for providing decisions/output data 54.

Again, precursor ISI reduction block 120 is not limited to receiving pre-equalized or equalized digital samples 41. However, conventionally, a received signal is pre-equalized to some extent prior to input to an ADC.

Accordingly, precursor ISI reduction block 120 may more generally be thought of as either an analog or digital precursor ISI reduction block 120, where an incoming signal is input to such precursor ISI reduction block 120 prior to making one or more decisions therefor regarding data in such incoming signal. In other words, generally a signal is cleaned up to reduce ISI therein prior to input to a data slicer. For purposes of clarity by way of example and not limitation, with the above context of receiver 110 of FIG. 1A borne in mind, analog-to-digital processing by precursor ISI reduction block 120 is described further in additional detail.

Figure 2:
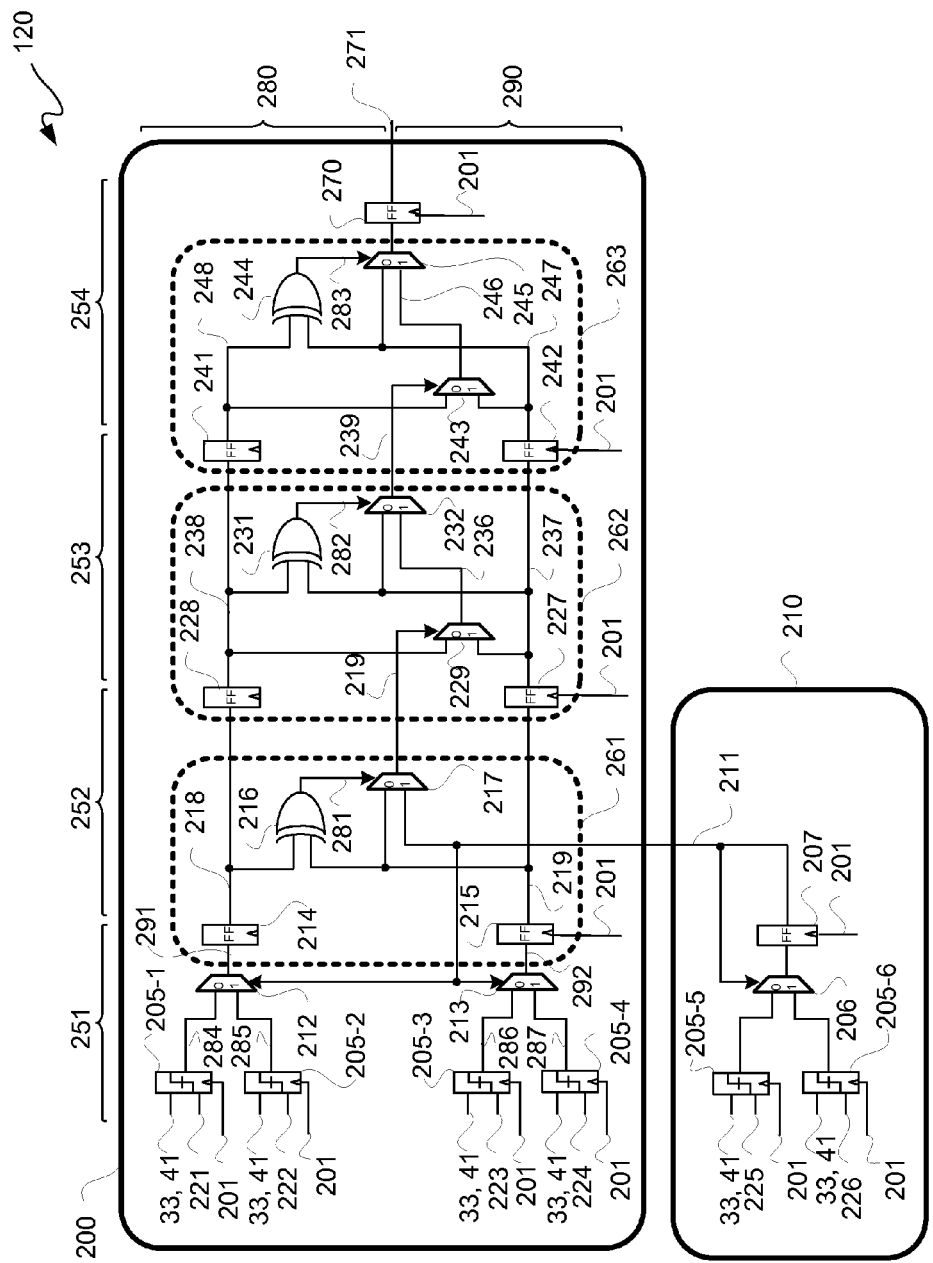
FIG. 2 is a schematic diagram depicting an exemplary precursor inter-symbol interference (ISI") reduction block, such as for the receiver described with reference to FIG. 1A.

FIG. 2 is a schematic diagram depicting an exemplary precursor ISI reduction block 120, such as for a receiver 110 as described with reference to FIG. 1A. Precursor ISI reduction block 120 includes an N-stage PIC 200, for N a positive integer greater than one. In other words, at least two iterative stages may be used in a PIC 200. Precursor ISI reduction block 120 further includes a postcursor decision block ("decision block") 210 coupled to PIC 200, as described below in additional detail.

In this example implementation, N is equal to 3. However, more probabilistically accurate precursor ISI cancellation may be provided by using more than three stages in other implementations. Along those lines, effectively additional stages or iterations may provide for a more refined or accurate speculation as to precursor ISI for purposes of cancellation. Moreover, as few as two stages may be used for precursor ISI cancellation by PIC 200; however, this may not provide sufficient precursor ISI cancellation for some high-speed serial applications.

Though the term "cancellation" is used herein, such term is not meant to preclude existence of residue or residual precursor ISI remaining in an output signal from precursor ISI reduction block 120, such as an output digital signal 121 in this example. While cancellation by precursor ISI reduction block 120 may cancel out all precursor ISI in an input analog signal 33 for providing corresponding output digital samples 121 in some instances, in other instances output digital samples 121 may have residue precursor ISI after such cancellation by precursor ISI reduction block 120. Even though an input analog signal 33 is described, in another implementation an input digital signal 41 may be used. Along those lines, rather than analog comparators 205, digital comparators 205 may be used.

In this example, PIC 200 includes four pipelined stages 251 through 254 and three iterative precursor ISI reduction stages 261 through 263 for reducing precursor ISI. There is a fifth pipelined stage if output register 270 is included.

Along those lines, in this example, PIC 200 has a 5-cycle clock latency of clock signal 201 from input to comparators 205 to output from output register or flip-flop ("FF") 270. In this example of precursor ISI reduction block 120, all registers and all comparators are clocked with a same clock signal 201, even though clock signal 201 is only expressly indicated for comparators 205 and some registers thereof.

Each of comparators 205 in this example is configured for receiving analog input levels. However, as previously indicated, analog comparators 205 may be replaced with digital comparators 205 for a completely digital implementation of precursor ISI reduction block 120 as in FIG. 1B.

Again, in this example, input analog signal 33 is pre-equalized, such as by AGC and/or CTLE for example. Along those lines, input analog signal 33 is prior to making a decision, such as by either a DFE block or a slicer, and input analog signal 33 may have precursor ISI ("precursor") and may have a first postcursor ISI ("first postcursor"), namely such precursor and first postcursor may not have been removed by such pre-equalization.

An input analog signal 33 is provided as an input to each of comparators 205 of PIC 200, as well as to each of comparators 205 of decision block 210. Comparators 205-1 through 205-4 of comparators 205 of PIC 200 are further respectively coupled to receive threshold levels 221 through 224, and comparators 205-5 and 205-6 of comparators 205 of decision block 210 are further respectively coupled to receive threshold levels 225 and 226. In this example, threshold levels 221 through 224 correspond to −h1−hm1, +h1−hm1, −h1+hm1, and +h1+hm1, and threshold levels 225 and 226 correspond to −h1 and +h1. Effective magnitude of a precursor ISI value or coefficient is referred to as "h minus 1" or "hm1", and effective magnitude of a postcursor value or coefficient for a first tap filter coefficient is referred to as "h1". Accordingly, possible contributions or effects of precursor ISI magnitude hm1 may be all possible comparable contributions as reflected in threshold levels 221 through 224.

Magnitude values for h0, h1, hm1 and other channel coefficients may vary from channel to channel, and may change for a channel due to different environmental/ecosystem influences thereon. It should be appreciated that receiver 110 of FIGS. 1A and 1B may include circuitry for adaptation to a link. As known, link training may involve sending a training pattern of a sufficiently random sequence of data from transmitter 10 through channel 20 to obtain h0, h1 and hm1 values or channel coefficients associated with channel 20. Even though the example of a link training pattern is described, values for h1 and hm1 may be obtained by other forms of receiver channel adaptation.

Precursor magnitude speculation is provided with threshold levels 221 through 224 respectively provided to comparators 205-1 through 205-4, along with an input signal, such as analog input signal 33, for respective comparisons of level of such analog input signal 33 to each of such thresholds. Outputs from comparators 205-1 through 205-4 may respectively be first precursor speculative inputs 284, 285 for path 280 and second precursor speculative inputs 286, 287 for path 290. Such an hm1 precursor effect may be additive or positive, namely "+hm1", or subtractive or negative, namely "−hm1". For a +hm1, such precursor effect is to be reduced, including without limitation removed, by subtraction for reduction of precursor ISI, and, for a −hm1, such precursor effect is to be reduced by addition for reduction of precursor ISI.

Along those lines, positive and negative values of a postcursor magnitude h1, which may be associated with a DFE filter coefficient h1, may be used along with positive and negative values of precursor ISI magnitude hm1 to cover possible states of effect of precursor magnitude on an analog input signal 33, namely threshold levels 221 through 224 corresponding to −h1−hm1, +h1−hm1, −h1+hm1, and +h1+hm1.

Postcursor magnitude speculation is provided with threshold levels 225 and 226. Threshold levels 225 and 226 may correspond to positive and negative values of postcursor magnitude h1, which may be associated for example with a finite impulse response filter coefficient of a DFE block for example. Along those lines, comparators 205-5 and 205-6 may be used to speculate as to magnitude of a first postcursor in analog input signal 33 to obtain a decision 211, as described below in additional detail.

Decision block 210 may be thought of as an unrolled DFE portion, namely a first tap of a DFE unrolled, which may have at least one tap. Unrolling this DFE portion may be for purposes of at least meeting timing restrictions. In this example, decision block 210 is a conventional unrolled 1 tap DFE block.

With a more relaxed timing constraint, a direct feedback of h1 as compared to zero, namely either a positive or negative postcursor effect, from a DFE block may be used in place of decision block 210 for providing a decision 211 directly from such feedback. However, it shall be assumed that a high-speed serial link application is involved, where decision block 210 is used to meet a timing constraint closure which could not be met with a direct feedback of decision 211 from a DFE block, such as DFE block 52 for example.

Generally, decision block 210 is speculative to predict a future bit level. Along those lines, outputs of comparators 205-5 and 205-6 may generally be opposite states of one another, namely either a logic 0 or a logic 1. Outputs of comparators 205-5 and 205-6 are respectively input to a select circuit, such as a multiplexer 206. Output of multiplexer 206 selects either output of comparator 205-5 or comparator 205-6 for output from multiplexer 206 responsive to feedback of a decision 211 output from register 207, which is provided as a control select input to multiplexer 206. Output of multiplexer 206 is provided as an input to register 207.

As register 207, as well as comparators 205-5 and 205-6, are clocked responsive to clock signal 201, output of register 207 used to provide decision 211 to PIC 200, as well as a control select input to multiplexer 206, is predictive of a future bit level based on a prior postcursor ISI magnitude reflected in a then current decision 211.

Postcursor speculation is therefore substantially different from precursor speculation. Postcursor speculation results in an output decision after output from postcursor output register 207, namely selection speculation of postcursor ISI may be completed responsive to such output of output register 207 of decision block 210. However, with precursor speculation an output decision may not be reached until a third stage final output 271 from output register 270. Along those lines, the number of stages or iterations may directly relate to probability of a correct decision. For postcursor ISI speculation, a single iteration may be sufficient for obtaining a sufficient probability of accurate prediction. However, in this example, three iterations are used for obtaining a sufficient probability of an accurate prediction for precursor ISI speculation. Furthermore, precursor ISI speculation and subsequent iteration is a look ahead form of prediction in contrast to postcursor ISI speculation and decision.

An output from comparator 205-1 and an output from comparator 205-2 may be provided as inputs to multiplexer 212. An output from comparator 205-3 and an output from comparator 205-4 may be provided as inputs to multiplexer 213. Output 291 from multiplexer 212 may be provided as an input to register 214, and output 292 from multiplexer 213 may be provided as an input to register 215.

Outputs from multiplexers 212 and 213 may be selected by providing decision 211 as a control select input to each of those multiplexers. A selected output ("output") from multiplexer 212 may be provided as an input to an input register 214 of first stage 261, and output from multiplexer 213 may be provided as an input to an input register 215 of first stage 261. Thus, selection of a postcursor value may be used to generally select each initial speculative precursor value outputs 291 and 292 as respective inputs to a first iterative precursor ISI reduction stage ("first stage") 261 with one going to path 280 and a separate and different one going to path 290. In this implementation, path 280 is configured to assume a future bit is a minus/negative value or zero, and path 290 is configured to assume a future bit is a plus/positive value. In another implementation, path 280 may be configured to assume a future bit is a minus value, and path 290 may be configured to assume a future bit is a plus value or zero. Along those lines, a zero future bit value is not assumed to be a positive value, but rather neither a negative nor a positive future bit value for a non-return to zero ("NRZ") modulation.

In order to delineate between stages, types of precursor speculation, and postcursor/precursor decisions, the following notations are used herein starting with a third stage final output ("final output") 271 and working backwards from there. Final output 271 may be expressed as d̂k, where d̂k indicates a final outcome or decision d̂ for a kth sample for k a sample index. Final output 271 (d̂k) is selected from one of two paths used to speculated between a positive future symbol, namely generally an −hm1 path 280, and a negative future symbol, namely generally an +hm1 path 290, where d is for a precursor decision on path 280, d' is for a precursor decision on path 290, and d" is for a postcursor decision, namely decision 211. To indicate samples according to stages, (k−1), (k+2), and (k+3) respectively indicate kth samples in stages or iterations 263, 262, and 261, where iteration stage 261 corresponds to a decision determination of decision block 210.

Path 280 is configured to assume or speculate that a future bit is a negative one or zero for NRZ signaling. Path 290 is configured to assume or speculate that a future bit is a positive one for NRZ signaling. Even though NRZ signaling is used in this example, other types of signaling may be used including without limitation pulse amplitude modulation ("PAM") or NRZ inverted ("NRZI"), among other types of modulation. Moreover, this is a full-rate implementation of a PIC 200. However, in another implementation, PIC 200 may be a half-rate implementation, namely an even path or an odd path. Along those lines, two PICs 200 may be used, namely one for an odd path and another for an even path, and frequency of clock signal 201 may be reduced accordingly.

Third stage 263 includes registers 241, 242, multiplexers 243, 245, and exclusive-OR gate ("XOR gate") 244. Second stage 262 may be a copy of the circuitry of third stage 263, and first stage 261 may be similar to second stage 262 except for input of decision 211, as described below in additional detail.

Though specific circuit examples are illustratively depicted, it should be understood that these or other equivalent circuits may be used in accordance with the description herein. Moreover, again even though a 3-stage implementation is illustratively depicted, PIC 200 may be extended to more than 3-stages by repeating circuitry, as described herein, for additional stages culminating in a final output register. Along those lines, BER may be substantially improved when an hm1/h0 ratio is high, for h0 a filter coefficient. BER may exponentially improve by adding stages/iterations to PIC 200. Accordingly, PIC 200 may be instantiated in an FPGA using programmable resources thereof to provide any number of stages as described herein as may vary from application to application.

If paths 280 and 290 in third stage 263 have the same output, which are both input to multiplexer 245, then a final output 271 (d̂k) may be selected from either of these inputs to multiplexer 245, namely from either of paths 280 and 290. In other words, if third stage decision signal 246 d(k−1), which may be interim third stage decision signal 248 d(k−1) output from multiplexer 243, equals third stage decision signal 247 d'(k−1), then a final output 271 (d̂k) may be selected from either of these inputs to multiplexer 245, namely from either of paths 280 and 290.

In addition to inputting third stage decision signal 247 into multiplexer 245, such third stage decision signal 247 may be input to XOR gate 244. Output of XOR gate 244 may be provided as a control select input 283 to multiplexer 245 for selecting output therefrom for input to output register 270. Another input to XOR gate 244 may be interim third stage signal 248.

Interim third stage signal 248 d(k−1) and third stage decision signal 247 d'(k−1) may both be inputs to multiplexer 243, and output of multiplexer 243 may be third stage decision signal 246. A control select signal 239 provided to multiplexer 243 may be a second stage final decision signal 239 output from multiplexer 232 of second stage 262. Interim third stage signal 248 and third stage decision signal 247 may be respectively sourced from the respective output ports of registers 241 and 242, which registers are input registers of third stage 263.

If paths 280 and 290 in third stage 263 do not have the same output as input to multiplexer 245, namely if third stage decision signal 246 d(k−1) does not equal third stage decision signal 247 d'(k−1), then a final output 271 (d̂k) may be selected based on an outcome of interim second stage signal 238 d(k+2) and second stage decision signal d'(k+2) 237. Then such decision falls to a previous stage in such iterative pipeline, as described below in additional detail.

Generally, there are several possible outcomes. For example, both paths 280 and 290 may yield a correct decision or value. This might happen as precursor ISI may be a small portion of overall signal swing. In such an event, XOR gate 244 output may be zero, and in this implementation output on path 290 is selected for output in this circumstance. However, in another implementation, output on path 280 may be selected for output in this circumstance.

Moreover, for example; both paths 280 and 290 may yield an incorrect decision or value, and so as above in this implementation output of path 290 may be selected for output. However, this probability is small for a three stage iteration, and especially for a pre-equalized input analog signal 33.

Lastly, for example, one of paths 280 and 290 may yield a probability-based correct value or decision, and the other of such paths may yield a probability-based incorrect value or decision. In this last circumstance, XOR gate 244 outputs a logic 1 for selection of output of multiplexer 243 for output of multiplexer 245. However, output of multiplexer 243 is selected responsive to a control select signal 239 output from second stage 262. In other words, a decision is not made based on a third stage outcome in this event, rather such decision may be made from a future bit associated with a second stage outcome. This use of a future bit from a previous iterative stage is a look ahead. Accordingly, this is an iterative look ahead process, as described below in additional detail.

Second stage 262 includes registers 227, 228, multiplexers 229, 232, and XOR gate 231. If paths 280 and 290 in second stage 262 do have the same output as input to multiplexer 232, namely if second stage decision signal 236 d(k+2), which may be interim second stage decision signal 238 d(k+2) output from multiplexer 232, equals second stage decision signal 237 d'(k+2), then a final output 271 (d̂k) may be selected from either of these inputs to multiplexer 245, namely from either of paths 280 and 290. In other words, selection as between third stage decision signal 246 d(k−1) and third stage decision signal 247 d'(k−1) becomes determined, as such third stage decision may be selected by either of interim second stage signal 238 d(k+2) or second stage decision signal 237 d'(k+2).

In addition to inputting second stage decision signal 237 into multiplexer 232, such second stage decision signal 237 may be input to XOR gate 231. Output of XOR gate 231 may be provided as a control select input 282 to multiplexer 232 for selecting output therefrom, and output from multiplexer 232 may be provided for input as a control select of multiplexer 243. Another input to XOR gate 231 may be interim second stage signal 238.

Interim second stage signal 238 d(k+2) and second stage decision signal 237 d'(k+2) may both be inputs to multiplexer 229, and output of multiplexer 229 may be second stage decision signal 236. A control select signal 219 provided to multiplexer 229 may be a first stage final decision signal 219 output from multiplexer 217 of first stage 261. Interim second stage signal 238 and second stage decision signal 237 may be respectively sourced from the respective output ports of registers 228 and 227, which registers are input registers of second stage 262.

If paths 280 and 290 in second stage 262 do not have the same output as input to multiplexer 232, namely if second stage decision signal 236 d(k+2) does not equal second stage decision signal 237 d'(k+2), then a final output 271 (d̂k) may be selected based on an outcome of interim first stage signal 218 d(k+3) and first stage decision signal 219 d'(k+3).

Accordingly, if a stage has equality with respect to inputs of an output multiplexer of such stage, then either of those outputs may be selected for output from such output multiplexer. If, however, such stage does not have equality with respect to inputs of an output multiplexer of such stage, then the decision gets pushed down to a next lower neighboring stage for a look ahead based on a future bit prediction. If such next lower neighboring stage has equality with respect to inputs of an output multiplexer of such stage, then either of those outputs determines an output from a final stage output multiplexer. If, however, such next lower neighboring stage does not have equality with respect to inputs of an output multiplexer of such stage, then the decision gets pushed down to a next lower neighboring stage, and so on until the beginning of a PIC 200 pipeline is reached, as described below in additional detail.

First stage 261 includes registers 214, 215, multiplexer 217, and XOR gate 216. Interim first stage signal 218 d(k+3) and first stage decision signal 219 d'(k+3) may be respective outputs of registers 214 and 215 and respective inputs to input registers 228 and 227. In addition to inputting first stage decision signal 219 into multiplexer 217 along with postcursor decision signal 211, such first stage decision signal 219 may be input to XOR gate 216 along with interim first stage signal 218 d(k+3). Output of XOR gate 216 may be provided as a control select input 281 to multiplexer 217 for selecting output therefrom, and output from multiplexer 217 may be first stage final decision output 219, which may be provided for input as a control select of multiplexer 229.

If interim first stage signal 218 d(k+3) and first stage decision signal 219 d'(k+3) are equal, then selection of second stage decision signal 236 d(k+2) or second stage decision signal 237 d'(k+2) is determined, as previously described. If, however, interim first stage signal 218 d(k+3) and first stage decision signal 219 d'(k+3) are not equal to each other, then outcome of postcursor decision signal 211 d"(k+3) may be used. In other words, postcursor decision signal 211 d"(k+3), which is not speculative with respect to precursor ISI hm1, may be used to select between second stage decision signal 236 d(k+2) and second stage decision signal 237 d'(k+2).

Figure 3:
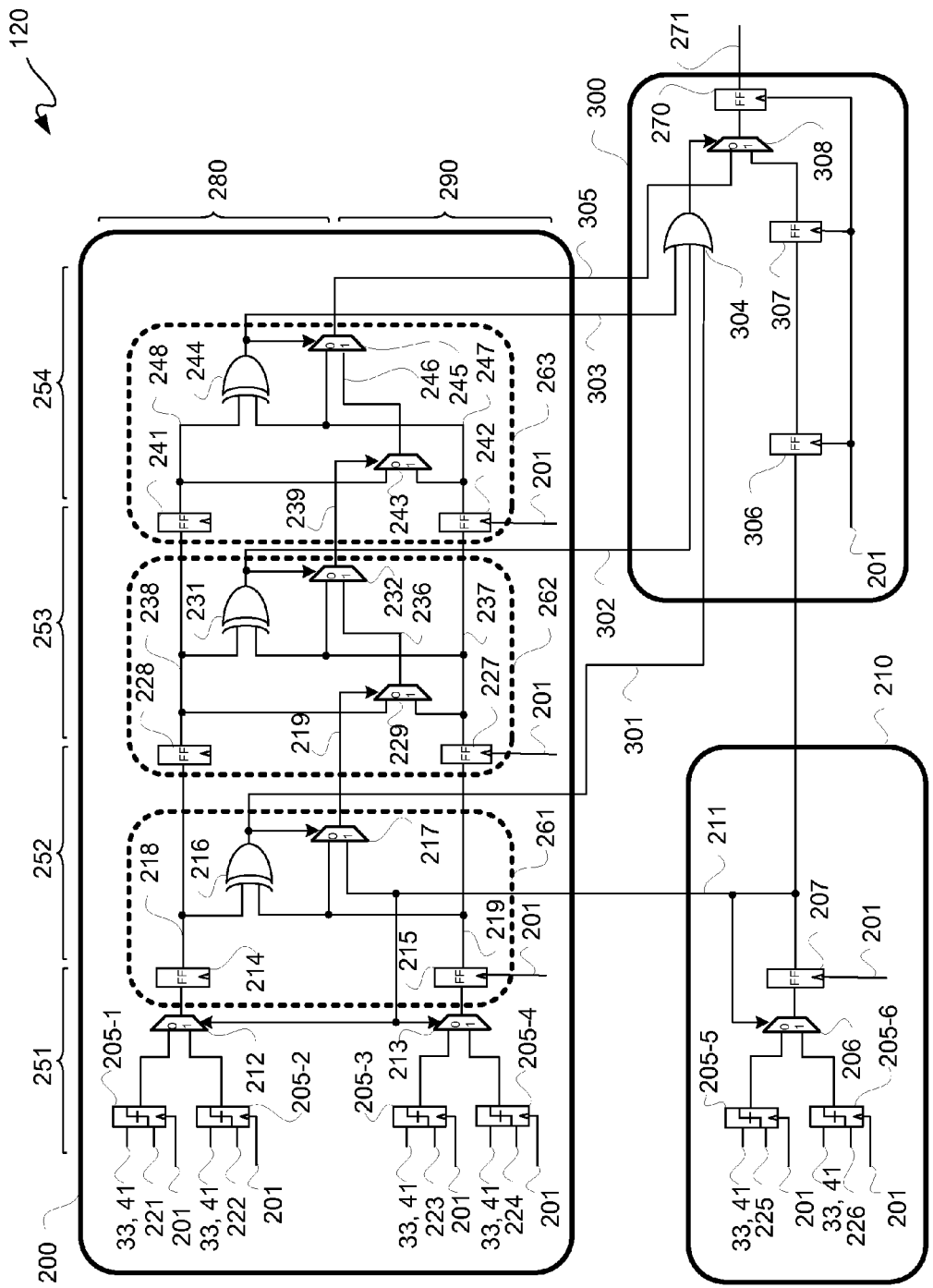
FIG. 3 is a schematic diagram depicting another exemplary precursor ISI reduction block, such as for the receiver as described with reference to FIG. 1B.

FIG. 3 is a schematic diagram depicting another exemplary precursor ISI reduction block 120, such as for a receiver 110 as described with reference to FIG. 1B. As many of the details of precursor ISI reduction blocks 120 of FIGS. 2 and 3 are the same, generally only the differences are described below for purposes of clarity and not limitation.

In this example implementation, each of comparators 205 is a digital comparator. Moreover, each of comparators 205 receives a digital samples signal 41 for input for comparison to respective thresholds 221-226, as previously described, though for digital values. However, in another implementation, rather than an input digital signal 41, an input analog signal 33 may be used along with analog comparators 205. Though output register 270 and XOR gates 216, 231, 244 may be coupled as previously described with reference to FIG. 2, optionally, a postcursor decision signal d"(k−1) of decision block 210 may be directly used as an estimate of a final output 271 ($\hat{d}k$), namely an estimate for precursor hm1 cancellation, by addition of output stage 300.

Output stage 300 may include an OR gate 304, a multiplexer 308, output register 270, and registers 306 and 307. Register 306 may be coupled to input decision 211 for providing to an input of register 307 for output to multiplexer 308, as described below in additional detail. OR gate 304 and multiplexer 308 may be coupled to PIC 200 as described below in additional detail. Lastly, output register 270, which may or may not be included in PIC 200, is relocated to output stage 300.

Decision 211 output from decision block 210 may be provided to a series of registers 306 and 307 clocked responsive to clock signal 201, as well as being input to PIC 200 as previously described with reference to FIG. 2. Registers 306 and 307 may correspond to input register stages of second stage 262 and third stage 263, respectively. Output of register 307, namely decision 211 after corresponding cycle latency to output of multiplexer 245, may be input to multiplexer 308. Another input to multiplexer 308 may be output from multiplexer 245, where multiplexer 308 is interposed between output of multiplexer 245 and input to output register 270 in this example implementation.

Additionally, outputs 301 through 303 respectively from XOR gates 216, 231, 244 may be inputs to an OR gate 304, as well as being control select inputs to multiplexers 217, 232, 245, respectively, as previously described. Output of OR gate 304 may be provided as a control select input to multiplexer 308. As long as output of OR gate 304 is a logic 0 in this example, output of multiplexer 245 is provided as an input to output register 270 for providing final output 271 selectively through multiplexer 308.

However, if output of OR gate 304 is a logic 1 in this example implementation, then output of multiplexer 308 is decision 211, which is provided as an input to output register to provide decision 211 as direct estimate of a final output 271 ($\hat{d}k$), namely an estimate for precursor hm1 cancellation. Again, this may occur when PIC 200 does not reach a decision based on iteration, as previously described.

Probability of not being able to make a decision after N stage/iterations and thus having to rely on a postcursor outcome without hm1 precursor speculation generally exponentially decreases with N. This probability is further a function of amount of precursor and postcursor ISI, as well as system noise and crosstalk. Along those lines, assuming probability of making a wrong decision at a given stage is $P_e$, and assuming probability of not being able to make a decision is $P_0$, then BER after an Nth stage of iteration may be derived as:

$$BER^N = P_e + P_0 \cdot BER^{N-1}.$$

For a high h1/h0 ratio, probability of making a wrong decision increases due to less accuracy in postcursor speculation, which may yield less BER improvement.

Accordingly, precursor speculation with iterative-pipelined stages thereafter configured for iterative look ahead operations has been described. Along those lines, precursor ISI cancellation may be provided with speculation through iteration, as described below in additional detail.

Figure 4:
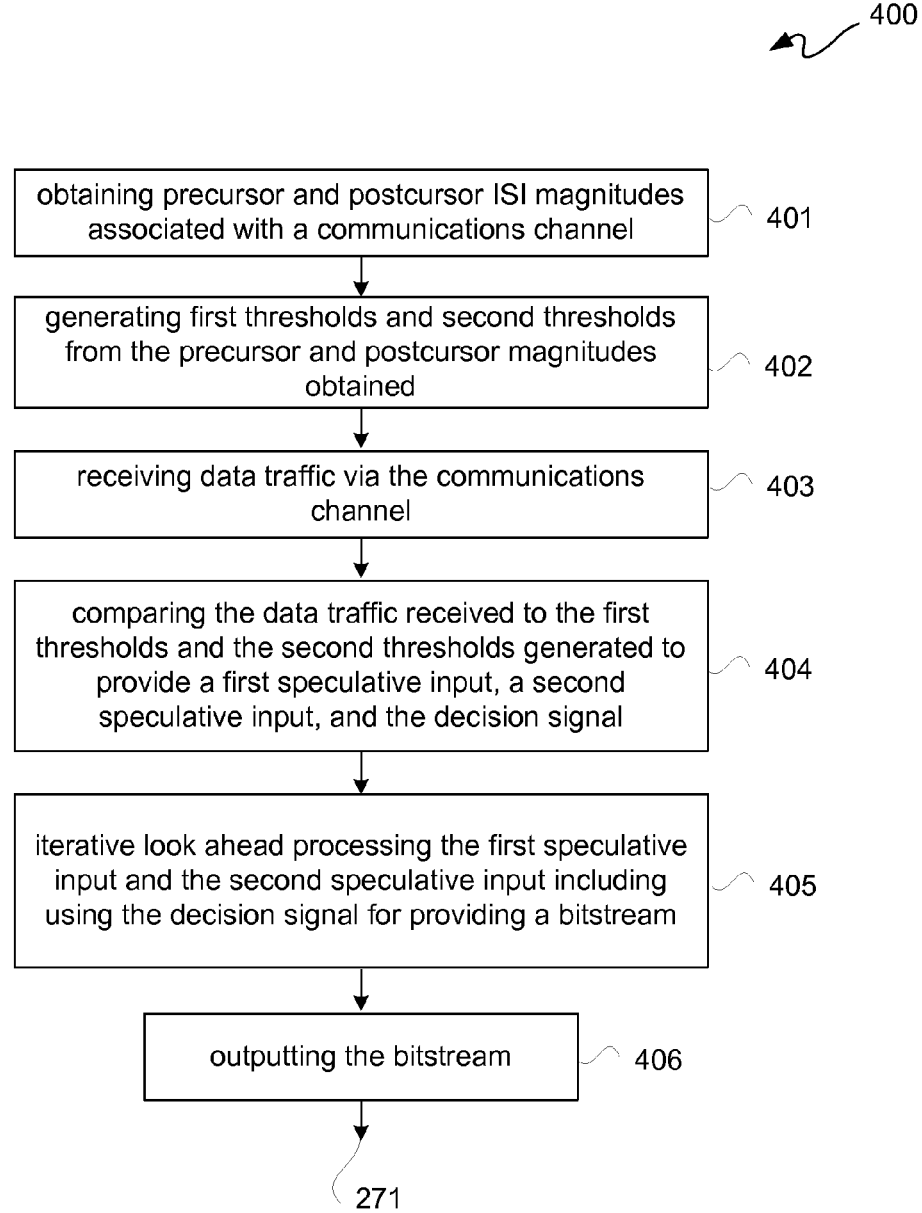
FIG. 4 is a flow diagram depicting an exemplary precursor ISI reduction flow for a receiver, such as the receiver in FIG. 1A or 1B.

FIG. 4 is a flow diagram depicting an exemplary precursor ISI reduction flow 400 for a receiver, such as receiver 110 as previously described herein. Precursor ISI reduction flow 400 is described further with simultaneous reference to FIGS. 1A through 4.

At 401, precursor and postcursor ISI magnitudes h1, hm1 associated with a communications channel 20 may be obtained. This obtaining at 401 may be through adaptation, as is known, or through loading predetermined values. At 402, thresholds 221-224 and thresholds 225, 226 may be generated from precursor and postcursor magnitudes obtained at 401. In generating thresholds 225 and 226, postcursor ISI magnitude h1 obtained at 401 may be directly used, though with a positive and a negative value therefor, as previously described.

At 403, modulated signal ("data traffic") 21 may be received by receiver 110 via communications channel 20. At 404, data traffic received at 403 may be compared to thresholds 221-224 and thresholds 225, 226 generated to provide a speculative input 291, a speculative input 292, and decision signal 211. If precursor and postcursor ISI magnitudes are obtained through a convention adaptive block, then data traffic may be received at 403 prior to obtaining such magnitudes at 401. However, for purposes of clarity by way of example and not limitation, it shall be assumed that precursor and postcursor ISI magnitudes are loaded predetermined values.

At 405, speculative input 291 and speculative input 292 may be iteratively look ahead processed. This iterative look ahead processing at 405 may include using decision signal 211 for providing a third stage final output ("bitstream") 271, including use in stage 261, as previously described, and optionally as a direct output for such bitstream, as previously described. Such iterative look ahead processing may include reducing precursor ISI in data traffic 21 for providing bitstream 271. At 406, bitstream 271 may be output from precursor ISI reduction block 120, which bitstream 271 may be further cleaned up for outputting from receiver 110.

Figure 5:
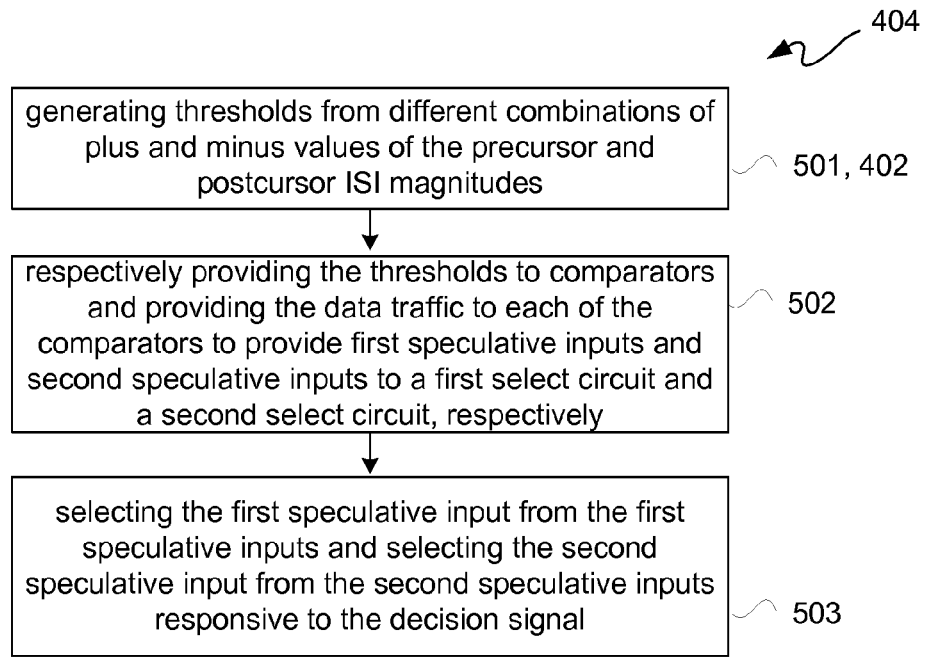
FIG. 5 is a flow diagram depicting an exemplary comparing operation for the precursor ISI reduction flow of FIG. 4.

FIG. 5 is a flow diagram depicting an exemplary comparing operation 404 for precursor ISI reduction flow 400 of FIG. 4. Comparing operation 404 is described further with simultaneous reference to FIGS. 1A through 5. At 501, thresholds 221-224 may be generated using different combinations of plus and minus values of precursor and postcursor ISI magnitudes obtained at 401.

At 502, thresholds 221-224 may be respectively provided to comparators 205-1 through 205-4. At 502, thresholds 225, 226 may be respectively provided to comparators 205-5, 205-6.

Still at 502, data traffic 21 may be provided to each of comparators 205-1 through 205-4 along with different thresholds, as previously described, to provide first speculative inputs 284, 285 and second speculative inputs 286, 287 to a select circuit, namely multiplexer 212, and another select circuit, namely multiplexer 213, respectively. Furthermore, at 502, data traffic may be provided to each of comparators 205-5 and 205-6 along with different thresholds, as previously described, to provide outputs therefrom for selection of a decision for decision signal 211, as previously described. At 503, speculative input 291 may be selected from first speculative inputs 284, 285 and speculative input 292 may be selected from second speculative inputs 286, 287 responsive to decision signal 211.

Figure 6:
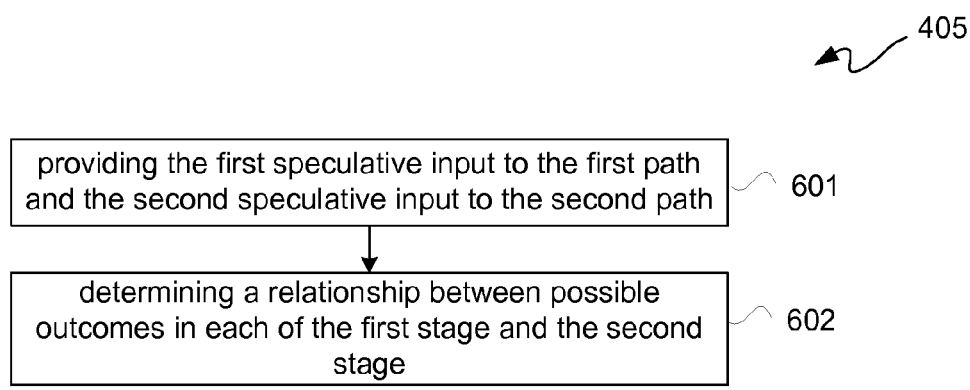
FIG. 6 is a flow diagram depicting an exemplary iterative look ahead processing operation for the precursor ISI reduction flow of FIG. 4.

FIG. 6 is a flow diagram depicting an exemplary iterative look ahead processing operation 405 for precursor ISI reduction flow 400 of FIG. 4. Iterative look ahead processing operation 405 is described further with simultaneous reference to FIGS. 1A through 6.

At 601, speculative input 291 may be provided to path 280 and speculative input 292 may be provided to path 290. Again, paths 280 and 290 include at least a first stage 261 and a second stage 262 for iterative look ahead processing of speculative input 291 and speculative input 292, with use of decision signal 211. At 602, a relationship (720) between possible outcomes in each of first stage 261 and stage 262 may be determined.

Figure 7:
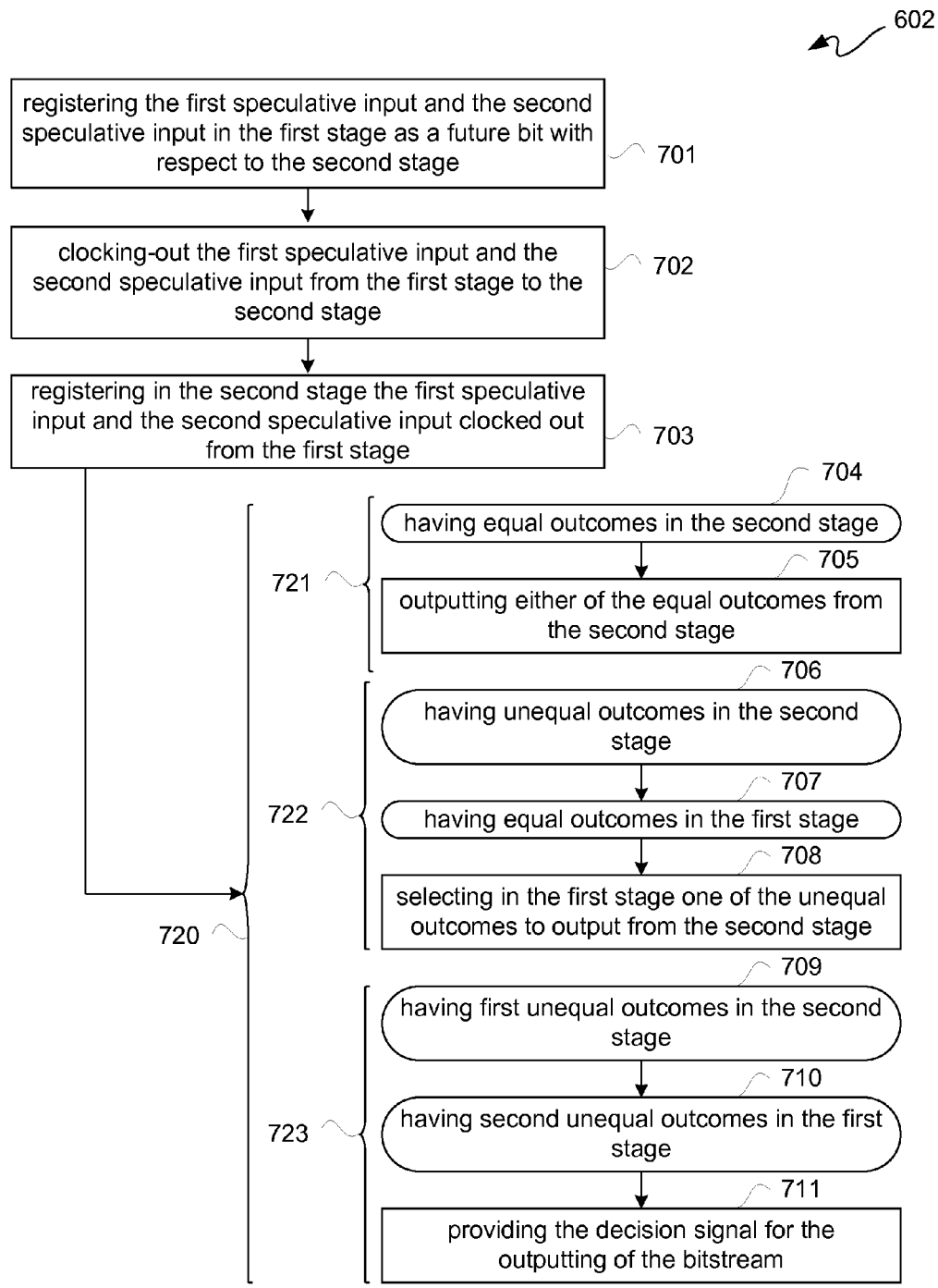
FIG. 7 is a flow diagram depicting an exemplary determining operation for the iterative look ahead processing operation of FIG. 6.

FIG. 7 is a flow diagram depicting an exemplary determining operation 602 for iterative look ahead processing operation 405 of FIG. 6. Determining operation 602 of iterative look ahead processing operation 405 is described further with simultaneous reference to FIGS. 1A through 7.

At 701, speculative input 291 and speculative input 292 may be registered in first stage 261 as a future bit with respect to second stage 262. At 702, speculative input 291 and speculative input 292 may be clocked out of first stage 261 for input to registers of second stage 262, as previously described. At 703, speculative input 291 and speculative input 292 clocked out from first stage 261 may be registered in second stage 262, as previously described.

There are three possible relationships 721-723 of relationships 720 which may be in stages 261 and/or 262 at a time. For relationship 721, a second or a final stage 262 has a state 704 of equal outcomes 236, 237 in such stage, and so at 705 either of such equal outcomes may be output from such stage.

For relationship 722, a second or a final stage 262 has a state 706 of unequal outcomes 236, 237 in such stage, and a first or prior stage 261 has a state 707 of equal outcomes 211, 219 in such stage, and so at 708 a selection in such first or prior stage 261 may be used to select one of such unequal outcomes in a second or subsequent stage 262 to output from such second or subsequent stage. Accordingly, this decision in such first or prior stage 261 for such second or subsequent stage 262 is a look ahead based on a prediction of a future bit value, namely a bit prediction register in such first or prior stage 261 which is a future bit with respect to such second or subsequent stage 262.

For relationship 723, a second or a final stage 262 has a state 709 of unequal outcomes 236, 237 in such stage, and a first or prior stage 261 has a state 710 of unequal outcomes 211, 219 in such stage, and so at 711 a decision signal 211 may be provided, either directly as previously described with reference to FIG. 3 or propagated through such stages as previously described with reference to FIG. 2, for outputting of a bitstream 271. Even though decision signal 211 is not precursor predictive, use of a postcursor prediction associated with decision signal 211 may yield a better BER than not using such postcursor prediction at all in the absence of being able to use a precursor prediction via PIC 200.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 8:
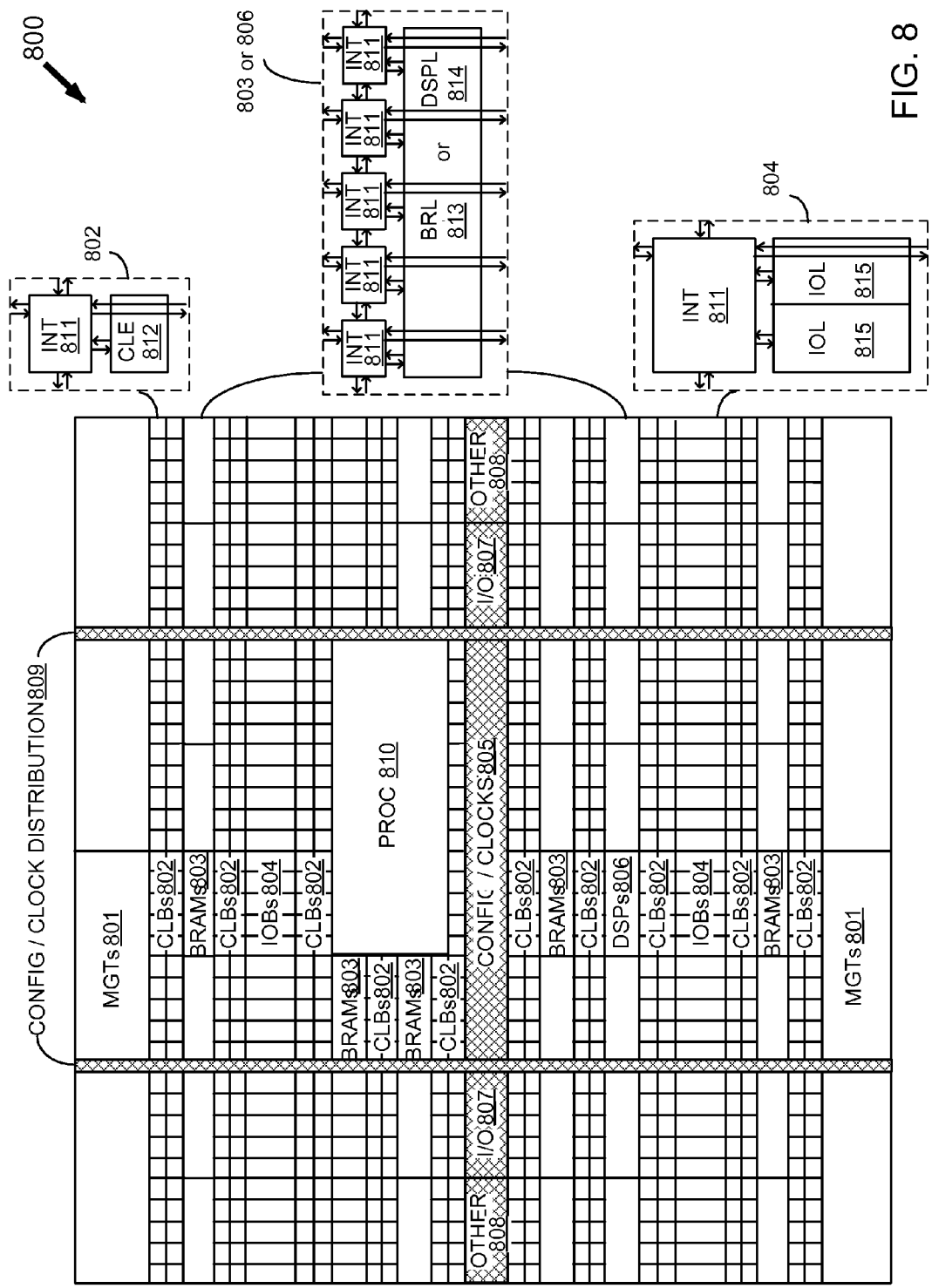
FIG. 8 is a simplified block diagram depicting an exemplary columnar Field Programmable Gate Array ("FPGA") architecture.

As noted above, advanced FPGAs can include several different types of programmable logic blocks in the array. For example, FIG. 8 illustrates an FPGA architecture 800 that includes a large number of different programmable tiles including multi-gigabit transceivers ("MGTs") 801, configurable logic blocks ("CLBs") 802, random access memory blocks ("BRAMs") 803, input/output blocks ("IOBs") 804, configuration and clocking logic ("CONFIG/CLOCKS") 805, digital signal processing blocks ("DSPs") 806, specialized input/output blocks ("I/O") 807 (e.g., configuration ports and clock ports), and other programmable logic 808 such as digital clock managers, analog-to-digital converters, system monitoring logic, and so forth. Some FPGAs also include dedicated processor blocks ("PROC") 810.

In some FPGAs, each programmable tile includes a programmable interconnect element ("INT") 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the top of FIG. 8.

For example, a CLB 802 can include a configurable logic element ("CLE") 812 that can be programmed to implement user logic plus a single programmable interconnect element ("INT") 811. A BRAM 803 can include a BRAM logic element ("BRL") 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element ("DSPL") 814 in addition to an appropriate number of programmable interconnect elements. An IOB 804 can include, for example, two instances of an input/output logic element ("IOL") 815 in addition to one instance of the programmable interconnect element 811. As will be clear to those of skill in the art, the actual I/O pads connected, for example, to the I/O logic element 815 typically are not confined to the area of the input/output logic element 815.

In the pictured embodiment, a horizontal area near the center of the die (shown in FIG. 8) is used for configuration, clock, and other control logic. Vertical columns 809 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 810 spans several columns of CLBs and BRAMs.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A receiver for coupling to a communications channel, comprising:
a precursor iterative canceller having a first path and a second path,
a postcursor decision block coupled to the precursor iterative canceller to provide a decision signal thereto;
wherein the precursor iterative canceller comprises:
a plurality of comparators for receiving an input signal and for receiving corresponding threshold inputs, the threshold inputs for precursor inter-symbol interference ("ISI") speculation;
select circuits for selecting a first speculative input for the first path and a second speculative input for the second path, the first speculative input and the second speculative input are respectively associated with a negative precursor contribution and a positive precursor contribution;
wherein the first path and the second path in combination include at least a first stage and a second stage for processing the first speculative input and the second speculative input;
wherein the decision signal is provided to the first stage and to the select circuits; and
wherein the select circuits are coupled to receive the decision signal for selection of the first speculative input and the second speculative input.

2. The receiver according to claim 1, wherein
the first path is for a negative future bit value; and
the second path is for a positive future bit value.

3. The receiver according to claim 2, wherein either the first path or the second path is further for a zero future bit value.

4. The receiver according to claim 1, wherein the precursor iterative canceller is configured for the input signal being modulated.

5. The receiver according to claim 4, wherein the precursor iterative canceller is configured for the input signal being modulated for non-return to zero or a non-return to zero inverted modulation.

6. The receiver according to claim 1, wherein the threshold inputs comprise −h1−hm1, +h1−hm1, −h1+hm1, and +h1+hm1 for h1 associated with postcursor ISI magnitude and hm1 associated with a precursor ISI magnitude.

7. The receiver according to claim 1, wherein the plurality of comparators is a plurality of analog comparators.

8. The receiver according to claim 1, wherein the plurality of comparators is a plurality of digital comparators.

9. The receiver according to claim 1, wherein:
a first multiplexer of the select circuits is coupled to select the first speculative input as between first outputs of a first comparator and a second comparator of a first portion of the plurality of comparators responsive to the decision signal; and
a second multiplexer of the select circuits is coupled to select the second speculative input as between second outputs of a third comparator and a fourth comparator of a second portion of the plurality of comparators.

10. The receiver according to claim 1, wherein:
the decision signal is a first decision signal;
the first stage is coupled to register the first speculative input and the second speculative input for passing to the second stage; and
the first stage is configured to logically combine the first speculative input and the second speculative input to provide a first select signal for selecting either the second speculative input or the first decision signal for output to the second stage as a second select signal.

11. The receiver according to claim 10, wherein:
the second stage is coupled to register the first speculative input and the second speculative input from the first stage;
the second stage Is configured to logically combine the first speculative input and the second speculative input thereof to provide a third select signal;
the second stage is configured to select either the first speculative input or the second speculative input thereof responsive to the second select signal received from the first stage to provide a second decision signal; and
the second stage is configured to select between the second speculative input thereof and the second decision signal responsive to the third select signal for providing a third decision signal.

12. A method for a receiver, comprising:
obtaining precursor and postcursor inter-symbol interference ("ISI") magnitudes associated with a communications channel coupled to the receiver;
generating first thresholds and second thresholds from the precursor and postcursor magnitudes obtained;
wherein the receiver includes a precursor iterative canceller having a first path and a second path,
wherein the receiver further includes a postcursor decision block coupled to the precursor iterative canceller to provide a decision signal thereto;
receiving data traffic via the communications channel;
comparing the data traffic received to the first thresholds and the second thresholds generated to provide a first speculative input, a second speculative input, and the decision signal;
iterative look ahead processing the first speculative input and the second speculative input including using the decision signal for providing a bitstream;
wherein the iterative look ahead processing includes reducing precursor ISI in the data traffic for providing the bitstream; and
outputting the bitstream.

13. The method according to claim 12, wherein the comparing comprises:
generating the first thresholds from different combinations of plus and minus values of the precursor and postcursor ISI magnitudes;
respectively providing the first thresholds to first comparators and the second thresholds to second comparators and providing the data traffic to each of the first comparators and the second comparators to provide first speculative inputs and second speculative inputs from the first comparators to a first select circuit and a second select circuit, respectively, and to provide the decision signal selected from outputs of the second comparators; and
selecting the first speculative input from the first speculative inputs and selecting the second speculative input from the second speculative inputs responsive to the decision signal.

14. The method according to claim 13, wherein the iteratively look ahead processing of the first speculative input and the second speculative input using the decision signal for providing the bitstream with reduction in the precursor ISI in the data traffic comprises:
providing the first speculative input to the first path and the second speculative input to the second path;
wherein the first speculative input and the second speculative input are respectively associated with a negative precursor contribution and a positive precursor contribution;
wherein the first path and the second path in combination include at least a first stage and a second stage for the iterative look ahead processing of the first speculative input and the second speculative input; and
determining a relationship between possible outcomes in each of the first stage and the second stage;
wherein determining comprises:
registering the first speculative input and the second speculative input in the first stage as a future bit with respect to the second stage;
clocking-out the first speculative input and the second speculative input from the first stage to the second stage; and
registering in the second stage the first speculative input and the second speculative input clocked out from the first stage.

15. The method according to claim 14, wherein the relationship comprises:
having equal outcomes in the second stage; and
outputting either of the equal outcomes from the second stage.

16. The method according to claim 14, wherein the relationship comprises:
having unequal outcomes in the second stage;
having equal outcomes in the first stage; and
selecting in the first stage one of the unequal outcomes to output from the second stage; and
wherein the decision in the first stage is a look ahead based on a prediction of the future bit thereof.

17. The method according to claim 14, wherein the relationship comprises:
having first unequal outcomes in the second stage;
having second unequal outcomes in the first stage; and
providing the decision signal for the outputting of the bitstream.

18. A system for receiving, comprising:
an analog preprocessing block for coupling to a communications channel;
a precursor iterative canceller having a first path and a second path coupled to the analog preprocessing block,
a postcursor decision block coupled to the analog preprocessing block and to the precursor iterative canceller;
wherein the postcursor decision block is coupled to provide a decision signal to the precursor iterative canceller;
wherein the precursor iterative canceller comprises:
a plurality of comparators for receiving an input signal and for receiving corresponding threshold inputs, the threshold inputs for precursor inter-symbol interference ("ISI") speculation;
select circuits for selecting a first speculative input for the first path and a second speculative input for the second path, the first speculative input and the second speculative input are respectively associated with a negative precursor contribution and a positive precursor contribution;

wherein the first path and the second path in combination include at least a first stage and a second stage for processing the first speculative input and the second speculative input;

wherein the decision signal is provided to the first stage and to the select circuits; and wherein the select circuits are coupled to receive the decision signal for selection of the first speculative input and the second speculative input.

19. The system according to claim 18, further comprising an analog-to-digital converter coupled to the analog preprocessing block for receiving an analog signal for providing a digital signal as the input signal.

20. The system according to claim 18, wherein:

the analog preprocessing block is coupled to the first path and the second path of the precursor iterative canceller for providing an analog signal as the input signal; and the analog preprocessing block is coupled the postcursor decision block for providing the analog signal thereto.

* * * * *